(12) United States Patent
Skidmore

(10) Patent No.: US 10,916,066 B2
(45) Date of Patent: Feb. 9, 2021

(54) METHODS OF VIRTUAL MODEL MODIFICATION

(71) Applicant: EDX Technologies, Inc., Austin, TX (US)

(72) Inventor: Roger Ray Skidmore, Austin, TX (US)

(73) Assignee: EDX TECHNOLOGIES, INC., Austin, TX (US)

( * ) Notice: Subject to any disclaimer, the term of this patent is extended or adjusted under 35 U.S.C. 154(b) by 0 days.

(21) Appl. No.: 16/390,356

(22) Filed: Apr. 22, 2019

(65) Prior Publication Data
US 2019/0325662 A1 Oct. 24, 2019

Related U.S. Application Data

(60) Provisional application No. 62/660,682, filed on Apr. 20, 2018.

(51) Int. Cl.
*G06T 19/00* (2011.01)
*G06T 19/20* (2011.01)
*G10L 15/22* (2006.01)

(52) U.S. Cl.
CPC .............. *G06T 19/20* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,299,192 B2* | 3/2016 | Kopelman | ............... | G06F 30/20 |
| 10,338,811 B2* | 7/2019 | Tarrago | ................... | G06T 19/20 |
| 10,409,363 B1* | 9/2019 | Kudirka | ............... | A63B 69/3658 |
| 2001/0007095 A1* | 7/2001 | Kehrle | ................... | G06F 30/00 |
| | | | | 703/2 |
| 2002/0180760 A1* | 12/2002 | Rubbert | ................. | G16H 50/50 |
| | | | | 345/630 |
| 2003/0021453 A1* | 1/2003 | Weise | ....................... | H02K 3/24 |
| | | | | 382/128 |
| 2005/0068315 A1* | 3/2005 | Lewis | ..................... | G06T 19/20 |
| | | | | 345/419 |
| 2005/0231532 A1* | 10/2005 | Suzuki | .................. | G06F 3/0338 |
| | | | | 345/633 |
| 2007/0247393 A1* | 10/2007 | Kuroki | ....................... | G06T 1/00 |
| | | | | 345/8 |
| 2008/0062167 A1* | 3/2008 | Boggs | ..................... | G06T 19/00 |
| | | | | 345/419 |
| 2010/0182316 A1* | 7/2010 | Akbari | .................... | G06T 17/05 |
| | | | | 345/427 |
| 2012/0113092 A1* | 5/2012 | Bar-Zeev | ............. | G06T 19/006 |
| | | | | 345/419 |
| 2013/0031511 A1* | 1/2013 | Adachi | ................. | G06F 3/0481 |
| | | | | 715/825 |
| 2013/0169681 A1* | 7/2013 | Rasane | ................... | G06Q 50/10 |
| | | | | 345/633 |
| 2013/0335405 A1* | 12/2013 | Scavezze | ............... | A63F 13/10 |
| | | | | 345/419 |
| 2014/0200863 A1* | 7/2014 | Kamat | .................... | G06T 19/00 |
| | | | | 703/1 |

(Continued)

*Primary Examiner* — Martin Mushambo
(74) *Attorney, Agent, or Firm* — W&C IP

(57) ABSTRACT

Methods and systems are provided for creating, modifying, and updating virtual models based on user instructions and a user's relationship with surroundings.

16 Claims, 5 Drawing Sheets

(56) References Cited

U.S. PATENT DOCUMENTS

| | | | |
|---|---|---|---|
| 2014/0247279 A1* | 9/2014 | Nicholas | G06T 19/006 345/633 |
| 2014/0247280 A1* | 9/2014 | Nicholas | G06F 3/011 345/633 |
| 2014/0267420 A1* | 9/2014 | Schowengerdt | G06F 3/012 345/633 |
| 2015/0130790 A1* | 5/2015 | Vasquez, II | G06T 19/006 345/419 |
| 2015/0363966 A1* | 12/2015 | Wells | G06F 3/017 345/419 |
| 2015/0375128 A1* | 12/2015 | Villar | A63H 30/02 446/454 |
| 2016/0212538 A1* | 7/2016 | Fullam | H04R 29/001 |
| 2016/0217590 A1* | 7/2016 | Mullins | G06T 7/40 |
| 2016/0321841 A1* | 11/2016 | Christen | G06F 3/167 |
| 2016/0343164 A1* | 11/2016 | Urbach | G02B 27/0093 |
| 2016/0349510 A1* | 12/2016 | Miller | H04N 13/398 |
| 2016/0364907 A1* | 12/2016 | Schoenberg | G06T 17/205 |
| 2016/0370855 A1* | 12/2016 | Lanier | G06F 3/005 |
| 2016/0378294 A1* | 12/2016 | Wright | G06T 19/006 715/851 |
| 2017/0038968 A1* | 2/2017 | Tarrago | G06F 30/00 |
| 2017/0069143 A1* | 3/2017 | Salter | G06F 3/167 |
| 2017/0124448 A1* | 5/2017 | Engel | G06F 11/008 |
| 2017/0186232 A1* | 6/2017 | Dange | G06T 19/00 |
| 2017/0199855 A1* | 7/2017 | Fishbeck | G06T 11/60 |
| 2017/0206419 A1* | 7/2017 | Mullins | G06T 19/20 |
| 2017/0243400 A1* | 8/2017 | Skidmore | G06F 3/04842 |
| 2017/0270715 A1* | 9/2017 | Lindsay | G06T 7/70 |
| 2017/0272729 A1* | 9/2017 | Kass | H04N 13/344 |
| 2017/0285738 A1* | 10/2017 | Khalid | G06F 3/04842 |
| 2018/0088185 A1* | 3/2018 | Woods | G06F 3/0346 |
| 2018/0095542 A1* | 4/2018 | Mallinson | G06F 3/017 |
| 2018/0174367 A1* | 6/2018 | Marom | A61B 34/10 |
| 2018/0199023 A1* | 7/2018 | Ishikawa | H04N 13/117 |
| 2018/0253900 A1* | 9/2018 | Finding | G06T 19/006 |
| 2018/0308290 A1* | 10/2018 | Perez | A63F 13/63 |
| 2018/0350137 A1* | 12/2018 | Skidmore | G06T 7/55 |
| 2018/0373324 A1* | 12/2018 | Baker | A63F 13/212 |
| 2019/0000578 A1* | 1/2019 | Yu | G06T 19/006 |
| 2019/0041651 A1* | 2/2019 | Kiemele | G06F 3/011 |
| 2019/0070506 A1* | 3/2019 | Stafford | A63F 13/537 |
| 2019/0134487 A1* | 5/2019 | Kudirka | A63F 13/65 |
| 2019/0269482 A1* | 9/2019 | Shanjani | G06F 3/013 |

* cited by examiner

METHODS OF VIRTUAL MODEL MODIFICATION

CROSS-REFERENCE TO RELATED APPLICATIONS

This application claims the benefit of U.S. Provisional Patent Application No. 62/660,682, filed Apr. 20, 2018, the complete contents of which are herein incorporated by reference.

FIELD OF THE INVENTION

Some embodiments of the invention generally relate to virtual models used for producing augmented reality (AR) and/or virtual reality (VR), in particular means for creating and making modifications to such virtual models.

BACKGROUND

As perhaps an obvious premise, human gain a utility from awareness that objects exist in their real world surroundings. It is beneficial to know that objects are present and, at least generally, where they are present. At a minimum this instructs a person where it is possible to physically navigate a path of movement. Another level of detail adds another level of utility. It is useful to know not only that an object exists before a person, but whether that object is say a wall, a building, a sidewalk, each of which can have very different implications for a person. Walls tend to be physically impenetrable, sidewalks completely traversable, and buildings variable. The latter case highlights the utility of still a further level of detail. If an object before a person is a building, it can be useful to know what are the buildings operating hours, what type of access the building permits (say a gym that permits entry of members, versus a secure government office that admits only government employees with a certain security clearance, versus a public museum open to all), or something as basic as the buildings identification (say it's address or its title).

Some virtual spaces exist which are made to take on the aspects of the real world. Google Street View, for example, is a compilation of photographs assembled in such a way as to give an impression of the viewer standing where the camera stood when the photographs were taken. If, say, a stone wall is demolished in the park adjacent to a location of Google Street View, however, the virtual space is unaware of this change for some time. A user physically standing on the street with a view of the park would, on the contrary, appreciate the change of a stone wall to an open space almost immediately.

The scenario of the preceding paragraph reflects a fundamental weakness of virtual spaces which are intended to tell users something about the real world. The real world is susceptible to regular change, and virtual spaces may lose accuracy and relevancy relatively quickly. This of course ignores another perhaps even more pervasive limitation on such virtual spaces: recognition of what objects even exist (even in the case of objects which for all intents and purposes never change). To use the same example as before, Google assembles Street View using photographs, but the Street View system may be ignorant as to whether a particular photograph contains park, or whether it contains a building, or whether it contains a brick façade building versus a glass façade building, or whether it contains a store or a home. Indeed, Google cleverly uses its reCAPTCHA authentication system to crowd source analysis of its Street View images to classify photos or parts of photos as crosswalks, or traffic lights, or storefronts, or other categories of things which the system may not be able to accurately assess (with, e.g., automated picture recognition software).

Trouble persists with constructing and maintaining virtual spaces with information instructive of what the virtual space represents, what should be changed from time to time, and, if a change is warranted, what that change should entail.

SUMMARY

According an aspect of some embodiments, a virtual model made to model the real world is made susceptible to on the fly changes coordinated by a user physically present within the real world space replicated by the virtual model. The method of modification may be straightforward, simple, and user-friendly. The method may allow a user on the go modifications to the model with minimal effort. As a user makes a physical walkthrough of a real world space, the user and the user's support device (e.g., a mobile device) make changes to objects and attributes of the virtual model in parallel with performance of a visual inspection of the real world.

Some embodiments generally involve using voice (i.e., oral) commands or other commands to format a building floorplan, modify clutter categories, etc. The types of entities that are modified are generally characterized as being a virtual model or one or more parts of a virtual model. In particular, these are virtual models which model one or more aspects of the real world.

Exemplary embodiments of the invention facilitate creating, changing, or modifying one or more virtual models. New models or new parts of models require new data to be created. The real world is also in a constant state of change, and a virtual model configured to model a changing real world must likewise undergo changes to remain accurate and relevant.

A floor plan is a type of virtual model that models a real building (either presently existing in the real world, formerly existing in the real world, or planned for construction to exist in the real world). A floor plan may also be a part of a virtual model that comprises the floor plan, among other things. Virtual maps are another type of virtual model. Virtual maps may use digital terrain data, clutter data, and or other types of data to characterize the land, structures, obstacles, and/or other objects and things at various real world locations that have corresponding locations within the virtual model.

It may be consequential that a user faces, points to, or is nearest to one object as opposed to some other object(s). For a virtual model to be accurately updated without undue details provided in a user's instructions, exemplary embodiments may rely on a determination of a physical relationship between the user and one or more objects corresponding with parts of the model. The physical relationship may be one or more of a number of conditions or circumstances. A physical relationship may be a proximity, a distance, an arrangement, and/or a spatial relationship between or among one or more users and one or more real objects or locations which have corresponding elements in parts of a virtual model. A spatial relationship between two or more objects (which may be virtual or real) may involve one or more of a topological relation, a distance relation, and a directional relation. A topological relation between an object A and an object B may be, for example, A is within B, A is touching B, A is crossing B, A is overlapping B, or A is adjacent to B. Determining the physical relationship between a user and one or more objects or locations corresponding with parts of a virtual model allows for an accurate determination of which part or parts of a virtual model to update in response to a user's instructions.

As a non-limiting illustrative example, an embodiment may be used to update a virtual model to include information about where and which walls of a building have certain installations such as wiring or plumbing. According to an exemplary method, a user may face a wall, give a verbal instruction, "Add wiring," and within the virtual model the wall the user is facing is modified to indicate that it contains wiring. A microphone, such as of a mobile device near or carried by the user, may detect the command. The instruction (i.e., command) is recognized, and a signal is sent to one or more storage media that store data for the virtual model. The data in such one or more storage media is updated to reflect the user's instruction. Subsequently, when the virtual model is accessed by the same user or possibly other users, the wall in question is configured (within the virtual model) to reflect that the wall contains wiring.

As another illustrative example, an embodiment of the invention may allow a user to characterize types of surroundings indoors. A user may look at a wall and say "drywall", and the embodiment may update the virtual model for the building to indicate that the wall the user looked at is drywall. A user may look at a wall and say "glass", and the embodiment may update the virtual model for the building to indicate the wall is glass. The formatting for the virtual walls may be changed immediately on an existing plan (the virtual model).

As another illustrative example, an embodiment of the invention may allow a user to characterize types of surroundings outdoors. A user, simply by his location, viewing direction, or a direction he points, in combination with a command, may change a virtual object of the virtual model of that outdoor space to indicate "tree", "azalea", "dogwood", etc.

DETAILED DESCRIPTION

In this disclosure, the terms "virtual model" and "virtual world" may be used interchangeably. Since the real world is three-dimensional (3D), a corresponding virtual model may also be characterized as 3D but need not necessarily be so (i.e., a model may be two-dimensional). An exemplary 3D virtual model has virtual locations which are configured to correspond with real world locations. In other words, the 3D virtual model may include a virtual landscape modeled after the real world landscape. Real world geography, locations, landscapes, landmarks, structures, and the like, natural or man-made, may be reproduced within the virtual world in like sizes, proportions, relative positions, and arrangements as in the real world. For example, an exemplary 3D virtual model of New York City would in fact resemble New York City in many respects, with matching general geography and landmarks. Within the virtual world, virtual objects may be created (e.g., instantiated) at virtual locations. Since a virtual location corresponds with a real world location, a virtual object at a given virtual location becomes associated with a particular real world location that corresponds with the given virtual location. Data stored by or with the virtual object is also inherently associated with the particular real world location. In some cases a single virtual object may be added as means for storing information for more than one location.

Figure 1A:
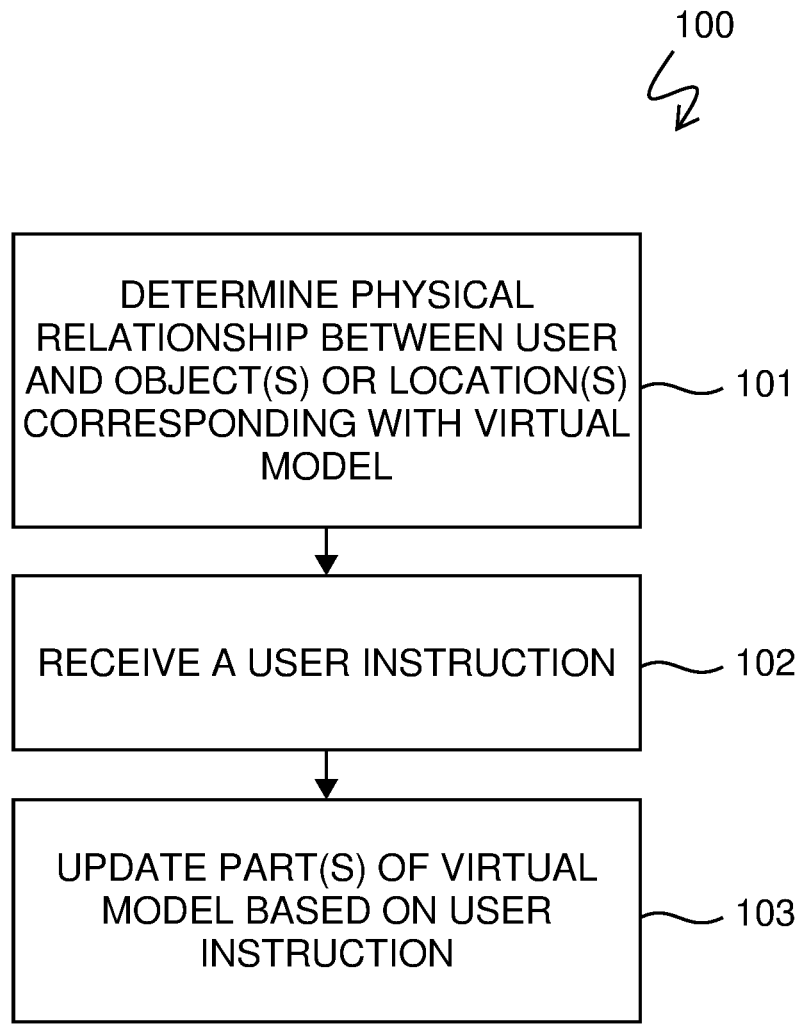
FIG. 1A is a flowchart of an exemplary method.

FIG. 1A illustrates an exemplary method 100 for creating or updating a virtual model for augmented or virtual reality according to an exemplary aspect of some embodiments. At block 101, a physical relationship is determined between a user and one or more objects or one or more locations that correspond with one or more parts of a virtual model. At block 102, a user instruction (or instructions) is received relating to updating the model. The instructions may be referred to as commands. At block 103, at least one of the parts of the virtual model is updated based on the user instruction.

Updating a part of a virtual model may comprise updating data associated with a part of a virtual model. Updating a part of a virtual model may comprise changing the appearance or location of a virtual object (a virtual object is an exemplary part of a virtual model).

Figure 1B:
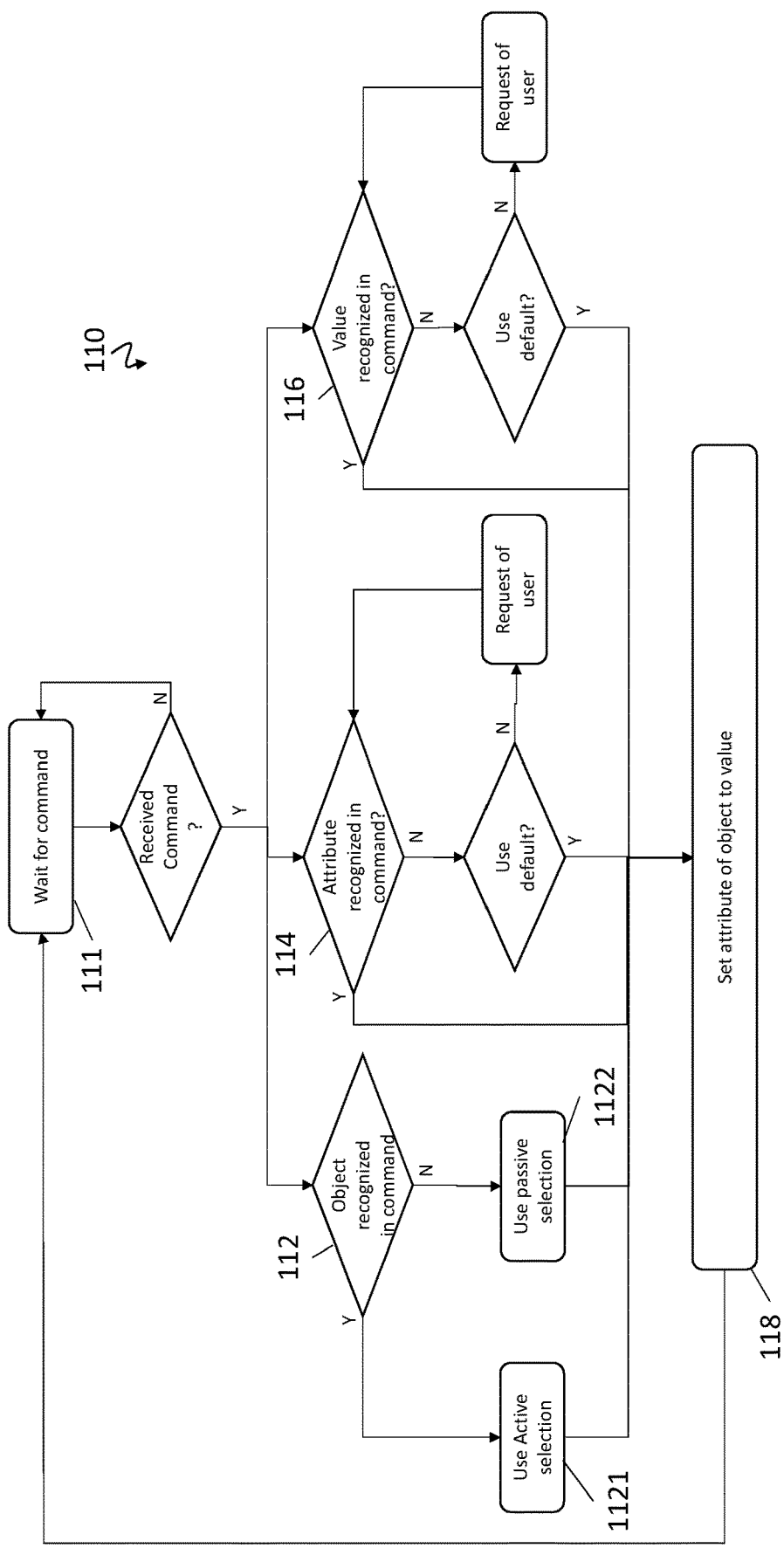
FIG. 1B is a flowchart of an exemplary process.

FIG. 1B shows an exemplary procedure 110 for updating a virtual model. Generally, procedure 110 presents routines which may be used, in whole or in part, in connection with performance of the method 100 of FIG. 1A.

In some embodiments, virtual model modification is driven by user input and facilitated by a computer (or computers; herein the singular is used for ease of discussion but is not meant to necessarily limit embodiments to single computer implementation). A supporting device (such as a mobile smartphone, wearable AR device, or the like) may continually await command instructions from a user at block 111. The device may be a sensing device having one or more microphones, accelerometers, gyrometers, cameras, buttons, touch-enabled display, or the like, one or multiple of which may be engaged in a state of active observance for detection of a user command. For ease of discussion, audible commands will be used for exemplary illustration.

Once the supporting device detects a command or what may constitute a command, the procedure 110 advances to one or more decisions blocks 112, 114, and 116 which assess and determine the implications of the command. In FIG. 1B the procedure 110 entails detecting in the received user command/instruction an identification of one or more of an object, an attribute, and a value. The element or elements of the model identified in the command is/are used to determine which of the one or more parts of the virtual model to update. Recognition at each of the decision block 112, 114, and 116 may be achieved by one or more of a variety of approaches and supporting software routines.

In the case of oral or audible commands, voice recognition software may be used such as but not limited to commercially available software such as Dragon (by Nuance), native OS solutions (e.g. Microsoft Voice Recognition, Google, Apple), or any number of other similar solutions. Such capabilities may be native to the supporting computing device, and software of exemplary embodiments may leverage that native service.

The supporting device, executing software instructions according to an exemplary embodiment, may be configured to recognize specific words or phrases. Examples may include but are by no means limited to "SELECT" or "SELECT OBJECT". Procedure 110 is adapted for a virtual model which is object-based. The virtual model is populated with objects. Individual objects have one or more (e.g., a plurality) of attributes. Attributes in turn may be assigned a particular value. An attribute may have any of a variety of values, and an object may have many attributes. Values may be qualitative, and values may be quantitative.

A command may refer only to an object level and concern only decision block 112. For example, a user may select an object and command its deletion. Alternatively a user may instruct a default object be instantiated. Generally, however, some exemplary uses may entail a number of commands which involve not merely creation or deletion of an object, but rather a change to something about the object. Namely, a command may instruct a change to an attribute (e.g., creation or deletion of the attribute), and/or a change to a value of an attribute. To change a value an attribute must be designated, and to change an attribute an object must be designated. Therefore in many instances all three decisions block 112, 114, and 116 are relevant to parsing a user command.

The object recognition pathway in process 110 facilitates ease of use with two alternative pathways for identifying an object for modification. If a user identified object is detected (constituting an active selection 1121), the user identified object is used for performing the update to the model. Conversely, if a user identified object is not detected, an object for updating is selected passively 1122. In some exemplary embodiments, the object selection is based on one or more of a location of the user and a direction of view of the user at the time of the command being received. Accordingly, passive selection 1122 may select the virtual object a user is facing or looking at, according to the viewer's real world location and direction of view as applied to the corresponding virtual model. Active selection 1121, by contrast, may entail the user specifying a particular object in an oral command, pointing in the direction of a virtual object (applying the user's real world directional indication to the corresponding virtual model), or entry of an object ID (e.g., the object name) into an interface like a button pad, keyboard, or touchscreen.

To facilitate flexibility with regard to the quality and contents of user commands, a procedure 110 may employ a variety of default decisions employed in an absence of certain information being recognized in the user command. With an object selected for modification, whether actively or passively, a question may remain as to whether and which attribute of that object should be changed, and whether and which value of that attribute should be changed.

According to procedure 110, if a user's command specifies a recognizable attribute (or attributes) for modification, the procedure may proceed with that selection. If a user's command does not specify a recognized attribute at decision block 114, the procedure may query whether default selection is enabled. If yes, the procedure may proceed with the default. If default selection is not enabled, then a request may be posed to the user to make a selection. A selection may constitute another command starting with block 111 again.

According to procedure 110, if a user's command specifies a recognizable value, (or values) to use when modifying one or more attributes, the procedure may proceed with that selection. If a user's command does not specify a recognizable value at decision block 116, the procedure may query whether default selection is enabled. If yes, the procedure may proceed with the default. If default selection is not enabled, then a request may be posed to the user to make a selection. A selection may constitute another command starting with block 111 again.

A culmination of the recognition, selection, and processing of blocks 112, 114, and/or 116 is an actual change at block 118 to the underlying data within the model in accordance with the specified criteria. For example, block 118 may comprise setting the selected attribute (specified by the user or selected by default) of the selected object (actively selected or passively selected) to the selected value (specified by the user or selected by default). The process 110 is recurrent, handling any number of commands from the user as they are received.

A method 100 or procedure 110 may start with a 3D virtual model of the location of interest. This may be pre-built (e.g., taking a blueprint, vectorizing it, scaling it, and extruding walls to appropriate height to form a 3D model of that floor of the building) or constructed on the fly (e.g., through real-time or near-total time geometry discernment via point-cloud capture and analysis techniques or depth perception capabilities) or a hybrid of the two. Virtual models employed in embodiments may be indoors, outdoors, or a combination of the two.

As a user traverses a real world locale corresponding with the virtual model, location and view orientation may be continually tracked, allowing for an alignment of the real world view and the three-dimensional (3D) virtual model. For example, standing in a room looking at a particular wall has a corresponding equivalent position in the virtual model looking at a plane (the "wall" as depicted in the virtual model). Traversing the real-world has a direct analog of traversing the virtual model. In some embodiments the virtual model may be wholly or partially (e.g., some degree of transparency) visible such that looking at the real-world results in the virtual model analog being visible.

Aspects of FIG. 1A and FIG. 1B are helpfully illustrated with an example. For this example it is assumed the model in use in an indoors model including, for example, the walls separating rooms, hallways, corridors, bathrooms, and the like. As already discussed, objects in the virtual model have assignable and editable attributes (e.g., material type for a "wall"/"plane" object). The assignable/editable attributes of virtual model objects may be utilized to determine their appearance. For example, a plane corresponding to a wall with MATERIAL TYPE=DRYWALL may appear gray in color, while a plane with MATERIAL TYPE=GLASS may appear shiny, translucent, or light blue in color. Overlays may be set and reproduced in an augmented reality output at a later time. The overlays may be colors (e.g., color coding), textures, or two- or three-dimensional geometric shapes, for example.

For a user to change one of the wall/plane objects, the following may be performed. Procedure 110 is executed to select the plane in the virtual model representing the wall in the real world. This may involve automated selection based on location a direction of view (or center of direction of view), where the user simply looking at a wall in the real world automatically selects the corresponding plane in the virtual model, according to a passive selection 1122.

Alternatively, the selection step may be active selection 1121. The user may for example take a specific action to identify the desired selection. The user may, for example, look at a wall and issue a voice command—"SELECT OBJECT"—or similar. Multiple objects or things could be selected. This would satisfy the decision branch 112 of process 110. The issued voice command may further stipulated, for example—"SET MATERIAL"—followed by "TYPE DRYWALL". The support device is preprogrammed to recognize a command such as SET, an attribute such as MATERIAL, and a value such as DRYWALL. Object, attribute, and value being designated, the support device may carry out the designated change in the underlying model data accordingly, consistent with block 118 of procedure 110. The voice command from the user effects a change in one or more of the assignable/editable attributes of the selected objects in the virtual model. In addition, the appearance of the virtual model objects may be updated to match the newly assigned/edited attributes if the object is visible in the AR or VR output supplied to the user.

Figure 2:
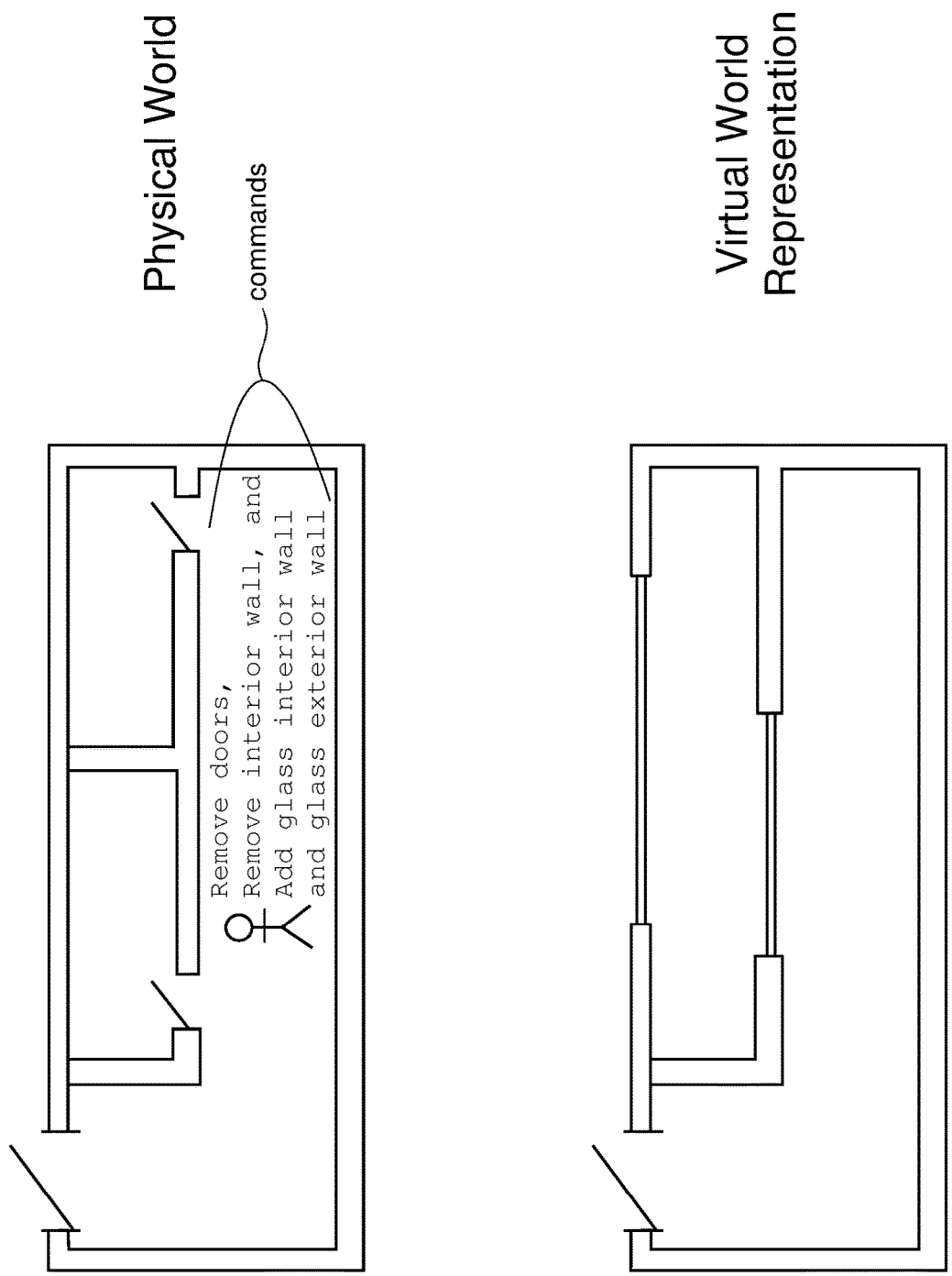
FIG. 2 illustrates another exemplary method.

As further example, FIG. 2 shows a non-limiting illustrative use scenario in which a user is updating a (virtual) building plan and the user is, in real time, in the real world building corresponding to the virtual building plan. In FIG. 2, figure-top illustrates a physical world, the virtual model of which may (initially) have substantially the same appearance. A problem faced by the user is adding details or changes to the virtual model about her real world surroundings which exist or appear in the real building. One task may be to update the virtual model to reflect planned changes involving removal of existing doors and interior walls and the addition of a new glass wall. According to an exemplary method, the user may give the commands shown in FIG. 2, namely "Remove doors. Remove interior wall. Add glass interior wall and glass exterior wall" or something similar. The exemplary system, sensing these commands and determining their meaning, automatically makes the changes in the virtual model. FIG. 2 at figure-bottom shows the virtual world after the modifications are made based on the user instructions. As compared to the original virtual world representation, which substantially corresponded with what is shown in FIG. 2 at figure-top, the virtual model now reflects the user's desired changes. Within the virtual model the two doors nearest the user have been removed, an interior wall has been removed, and a two-way glass wall has been added.

Figure 3:
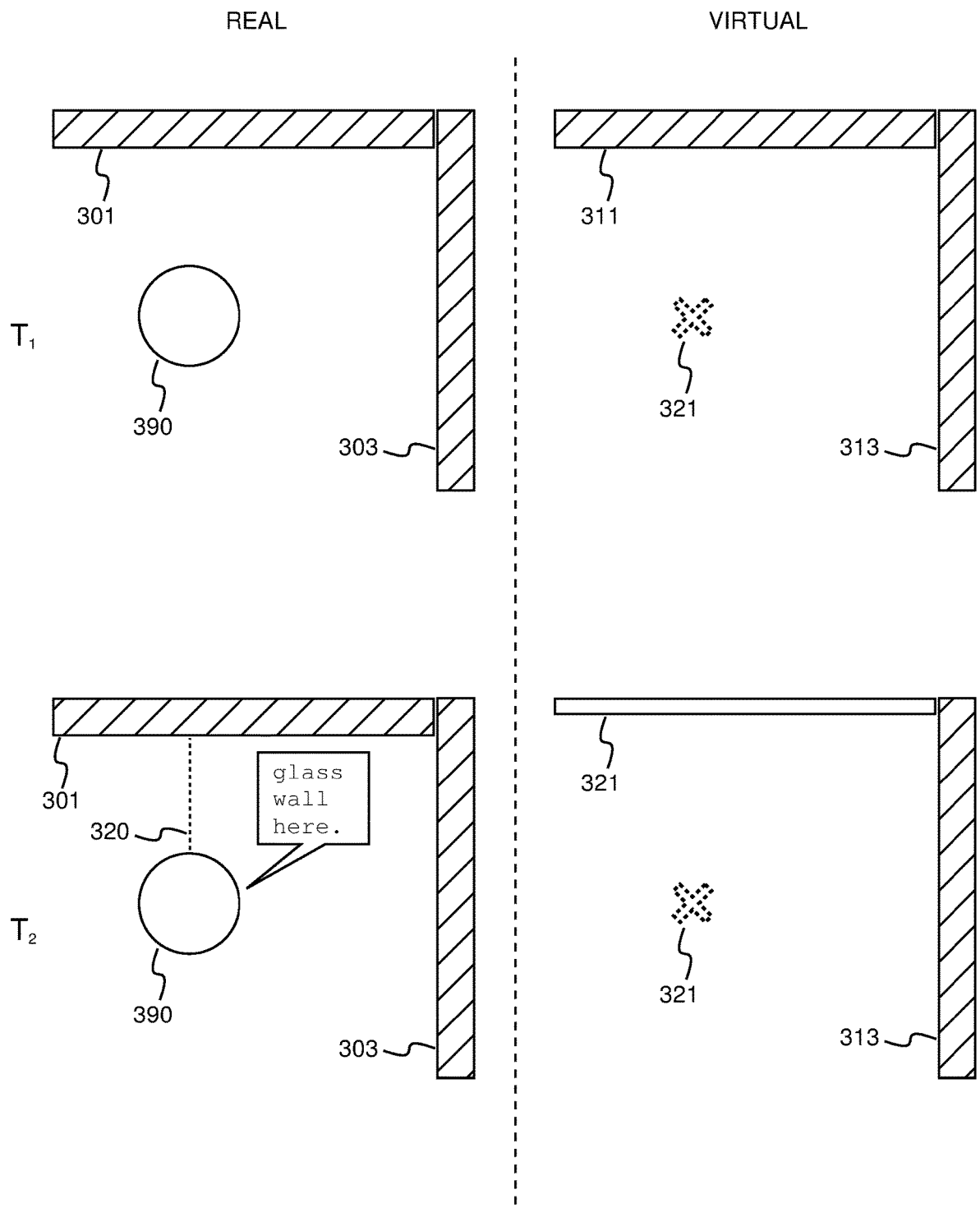
FIG. 3 illustrates another exemplary method.

FIG. 3 illustrates possible physical relationships an exemplary system may assess between a user and one or more objects or one or more locations that correspond with one or more parts of a virtual model. The left hand column depicts elements of the real world including real world objects. These include wall 301, wall 303, and person 390. The right hand column depicts a virtual model containing some virtual objects. These include virtual object 311 modeled after real object 301 and virtual object 313 modeled after real object 303. Indicium 321 is used in FIG. 3 to mark the location within the virtual model that corresponds with the real world location of user 390. At some initial time $T_1$, the real world and the virtual model substantially correspond in FIG. 3. At a subsequent time $T_2$, a user provides a verbal instruction to modify the model and the model is correspondingly updated based on the user instruction. Here, the user gives the instruction "glass wall here". The system performing the method (e.g., method 100 of FIG. 1A) is configured to determine what part or parts of the virtual model are subject to modification according to the instruction. This involves determining a physical relationship between the user and the user's surroundings. One method of determining a physical relationship is assessing a directional aspect of the user, such as a direction the user is looking, a direction the user is facing, or a direction the user is pointing. In FIG. 3, line 320 in the real world column is used to illustrate that the user's viewing direction meets wall 301 (not, for example, wall 303) when the command is given. The system may sense viewing direction 320 and thereby determine that the user's instructions relate to wall 301 (and thus corresponding virtual object 311). Another method of determining a physical relationship is assessing a proximity of the user with respect to real world objects or the locations of those objects. In FIG. 3, it is illustrated that the user 390 is closer to wall 301 than to wall 303. Thus, when the instruction "glass wall here" is received by the system, the system may sense the nearer proximity of the user to wall 301 as compared to other walls (e.g., wall 303) and determine that it is with respect to wall 301, the nearest wall, that the user's instruction refers. Accordingly, the system updates the virtual model to modify virtual object 311 (which corresponds with wall 301) into virtual object 321, which signifies a wall of glass material.

Determining a physical relationship between or among a user and one or more parts (e.g., objects) of a virtual model may involve sensing one or more characteristics of the user's viewing frustum, determining which virtual objects are within the user's viewing frustum, and selecting the at least one virtual object to be updated from among the virtual objects determined to be within the user's viewing frustum. Determining a physical relationship may involve defining one or more physical spaces with one or more geofences and determining whether the user falls within one or more of the geofences.

The ease and facility with which exemplary embodiments allow for 3D virtual model modification by a user in the real world physical space matching the virtual model are beneficial in their own right. Furthermore, model modification and updates are helpful in further aspects. In preceding examples, the presence of a wall, or the presence of a type of wall (e.g., drywall, concrete, or glass) may have various implications. For example, an embodiment may involve wireless network modeling. A concrete wall and a glass wall have very different effects on wireless signals. The range of coverage (e.g., in an outdoor space or in an indoor space), the quality of service, etc. are implicated. Allowing personnel to walk through a space and modify a virtual model to make the virtual objects more closely reflect their real world analogs and their attributes results in a more accurate and precise virtual model for wireless network simulation. A user of such an improved 3D virtual model may, for example, assess existing, planned, or hypothetical network configurations (e.g., based on contemplated deployment of towers in a city or wireless routers in an office) with the improved 3D virtual model.

Another potential use for model modification according to some embodiments is for rescue and/or evacuation planning. Presently, firefighter preplanning entails firefighters performing a building walkthrough when there is no fire, taking stock of floor plans (e.g., where is a cafeteria, where is a stairwell, where are cubicles, etc.), water valve locations, and the relationship among water valves (e.g., which valves share the same pipes and therefore pressure; which valves have independent pressure from one another). According to an aspect of some embodiments of the invention, a 3D virtual model of a building serves as a repository of the observations a firefighter's walkthrough. Specific floorplan features and water valve locations may be stored as digital objects within a virtual model matching the real world building. In the event of an emergency in the building, firefighters may access the virtual reality model of the building they are en route to save and apprise/familiarize themselves with the layout, water valve locations, building materials, and more. Upon arrival at and even entry into the building, the firefighters may use AR support devices to "see through" structures and walls and visualize parts of the virtual model the real world analogs for which are obscured or not in view (e.g., a firefighter may be provided a visualization of a water valve around a corner he has not yet turned). The firefighters may use information from the virtual model to identify walls which have materials suitable for tearing down if necessary.

Figure 4:
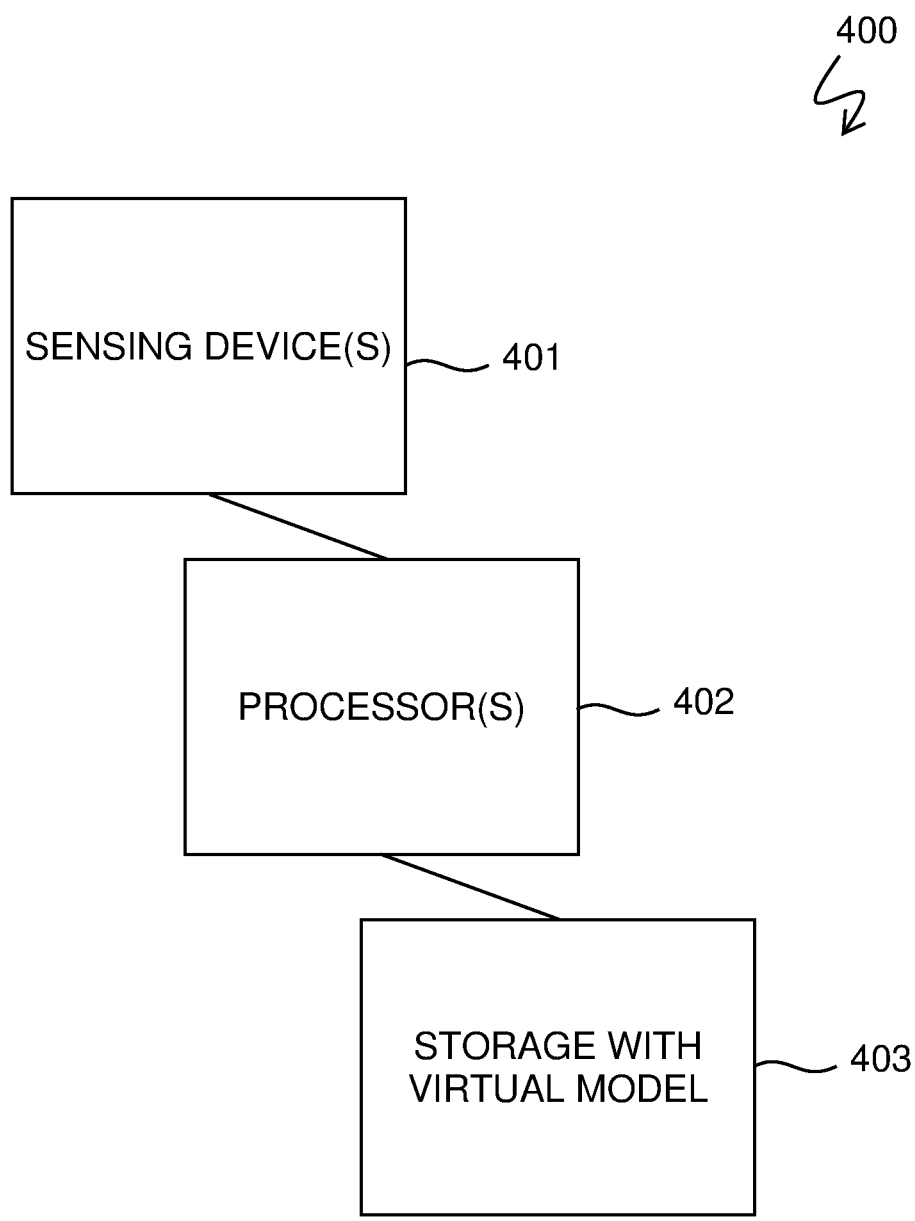
FIG. 4 is a block diagram of an exemplary system.

In the preceding paragraphs methods have been described with respect to various exemplary systems. FIG. 4 is a block diagram of an exemplary system 400 suited for performing steps of the above described methods. Generally, the system 400 comprises one or more sensing devices 401, one or more processors 402 (e.g., of one or more computers or other computing devices), and one or more storage media 403 which store data of the virtual model. These elements may be interlinked or communicate among themselves by any of various means, such as by transceivers that pass or exchange electromagnetic signals and/or by hardwires that carry electromagnetic signals via conductors. A sensing device may be a device which is portable and thus transportable with a user as a user moves about a real world space, e.g., the building of FIG. 2. The sensing device may have one or more sensors which may sense or detect, for example, the user's location, the user's viewing direction, the user's viewing frustum, and user instructions. One or more microphones of a sensing device are exemplary for sensing oral instructions of a user. A gyroscope, magnetometer, accelerometer, GPS module, and/or other sensors may be included in a sensing device 401. A sensing device 401 may be, for example, a smartphone, tablet, laptop, pager, wearable, some other portable electronic device, or some combination of these. The processor(s) 402 may be configured to perform computational processing necessary for steps of exemplary methods. The processor(s) 402 may be part of the same unitary device as sensing device 401 or may be independent thereof. For example, processors 402 may be local or remote from a user. A virtual model generally will have data which describes and characterizes it. Such virtual model data may be stored by one or more storage media 403. The processor(s) 402 may be configured to access storage 403 and make modifications or updates as necessary in accordance with methods of the invention. As used herein, support device, supporting device, AR device, and similar combinations or variants thereof may be used to refer to a sensing device, processors, or a combination thereof.

Exemplary embodiments may comprise computer-based hardware that is preconfigured to recognize particular commands. Known or future voice recognition algorithms and technologies may be employed for detecting and recognizing user instructions in some exemplary embodiments.

Embodiments herein differ from existing voice command technologies, however, in significant respects. For instance, exemplary embodiments may differ in the kinds of commands that are recognized, and what reaction is elicited by the command. In exemplary embodiments of the invention, exemplary computer-based systems are configured to recognize user instructions which direct modifications to a virtual model. An exemplary computer-based system then reacts to the user instruction by updating at least one of the parts of the virtual model based on the user instruction.

Some embodiments of the invention may be a system, a device, a method, and/or a computer program product. A system, device, or computer program product may include a computer readable storage medium (or media) having computer readable program instructions thereon for causing a processor to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other aspects of augmented reality and virtual reality devices and methods which may be used in accordance with some embodiments herein are disclosed in U.S. patent application Ser. No. 16/386,398, filed Apr. 17, 2019, the complete contents of which are herein incorporated by reference.

While the invention has been described herein in connection with exemplary embodiments and features, one skilled in the art will recognize that the invention is not limited by the disclosure and that various changes and modifications may be made without departing from the scope of the invention as defined by the appended claims.

I claim:

1. A method of modifying a virtual model for augmented or virtual reality, comprising
   determining a physical relationship between a user and one or more objects or one or more locations that correspond with one or more parts of the virtual model;
   receiving a user instruction;
   detecting in the received user instruction identification of one or more of an object, an attribute, and a value; and
   updating at least one of the one or more parts of the virtual model based on the user instruction and the determined physical relationship, the detected identification being used to select which of the one or more parts of the virtual model to update.

2. The method of claim 1, wherein the one or more parts are virtual objects.

3. The method of claim 2, wherein the determining step comprises
   sensing one or more characteristics of the user's viewing frustum;
   determining which virtual objects are within the user's viewing frustum;
   selecting the at least one virtual object to be updated from among the virtual objects determined to be within the user's viewing frustum.

4. The method of claim 1, wherein if a user identified object is detected, the user identified object is updated in the updating step, and if a user identified object is not detected, an object for updating is selected based on one or more of a location of the user and a direction of view of the user.

5. The method of claim 1, further comprising generating a request for user input if an attribute or value is not detected in the user instruction.

6. The method of claim 1, further comprising updating an augmented reality or virtual reality output that is based on the virtual model to visually reflect the updates from the updating step.

7. The method of claim 1, wherein the determining step comprises determining one or more of a proximity, a distance, and a spatial relationship.

8. The method of claim 1, wherein the user instruction comprises instruction to modify a building floor plan.

9. The method of claim 1, wherein the user instruction comprises instruction to modify clutter data.

10. The method of claim 1, wherein the user instruction comprises one or more oral commands.

11. A computer-program product for augmented or virtual reality, the computer program product comprising a computer readable storage medium having program instructions embodied therewith, the program instructions executable by one or more processors to cause the one or more processors to perform a method comprising
    determining a physical relationship between a user and one or more objects or one or more locations that correspond with one or more parts of the virtual model;
    receiving a user instruction;
    detecting in the received user instruction identification of one or more of an object, an attribute, and a value; and
    updating at least one of the one or more parts of the virtual model based on the user instruction and the determined physical relationship, the detected identification being used to select which of the one or more parts of the virtual model to update.

12. The computer-program product of claim 11, wherein if a user identified object is detected, the user identified object is updated in the updating step, and if a user identified object is not detected, an object for updating is selected based on one or more of a location of the user and a direction of view of the user.

13. The computer-program product of claim 11, the method further comprising updating an augmented reality or virtual reality output that is based on the virtual model to visually reflect the updates from the updating step.

14. An augmented reality (AR) or virtual reality (VR) system, comprising
- one or more sensing devices for sensing user commands;
- one or more processors;
- a computer readable storage medium having program instructions embodied therewith, the program instructions executable by the one or more processors to cause the one or more processors to perform a method comprising
  - determining a physical relationship between a user and one or more objects or one or more locations that correspond with one or more parts of the virtual model;
  - receiving a user instruction;
  - detecting in the received user instruction identification of one or more of an object, an attribute, and a value; and
  - updating at least one of the one or more parts of the virtual model based on the user instruction and the determined physical relationship, the detected identification being used to select which of the one or more parts of the virtual model to update.

15. The system of claim 14, wherein if a user identified object is detected, the user identified object is updated in the updating step, and if a user identified object is not detected, an object for updating is selected based on one or more of a location of the user and a direction of view of the user.

16. The system of claim 14, further comprising a display, the method further comprising updating an augmented reality or virtual reality output on the display that is based on the virtual model to visually reflect the updates from the updating step.

* * * * *